E. S. Capen,
Band Pulley.
Nº 79,634.  Patented July 7, 1868.

Attest:  
Thos. H. Dodge  
D. L. Miller

Inventor:  
E. S. Capen

United States Patent Office.

E. S. CAPEN, OF WORCESTER, MASSACHUSETTS, ASSIGNOR TO HIMSELF AND P. BLAISDELL, OF SAME PLACE.

Letters Patent No. 79,634, dated July 7, 1868.

IMPROVEMENT IN LOOSE PULLEYS.

The Schedule referred to in these Letters Patent and making part of the same.

KNOW ALL MEN BY THESE PRESENTS:

That I, E. S. CAPEN, of the city and county of Worcester, and Commonwealth of Massachusetts, have invented certain new and useful Improvements in Loose Pulleys; and I do hereby declare that the following is a full, clear, and exact description of the same, reference being had to the accompanying drawings, forming a part of this specification, in which—

Figure 1:
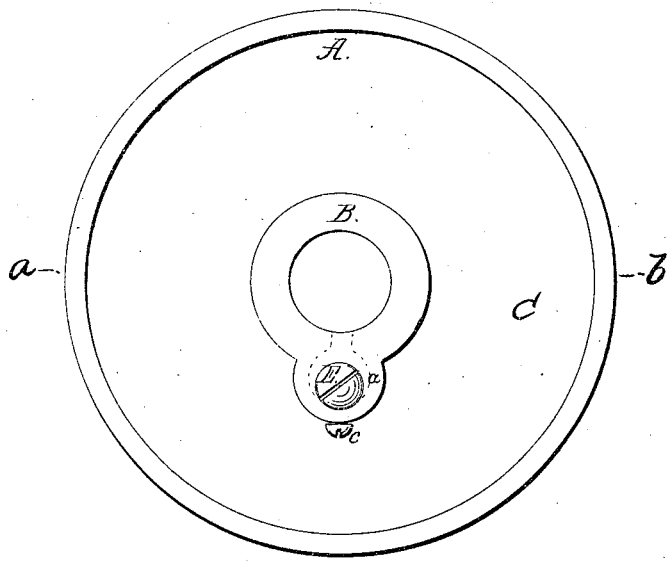
Figure 2:
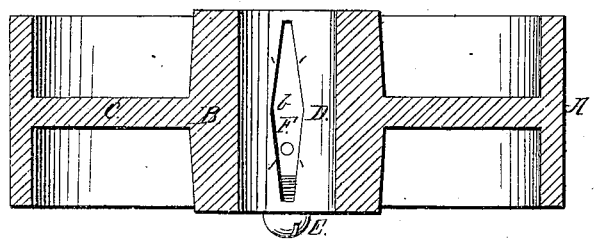

Figure 1 represents a side view of a loose pulley having my improvements applied thereto, and Figure 2 represents a section on line $a\,b$, fig. 1.

To enable those skilled in the art to which my invention belongs to make and use the same, I will proceed to describe it more in detail.

In the drawings, the part lettered A is the rim of the pulley, B the hub, and C the central web, which unites the rim and the hub.

One side of the hub, in this instance, is enlarged, as shown at $a$, and which enlargement is cored or chambered out from one end to the other, a sufficient thickness of metal only being left at each end to prevent holes being broken into said chamber while the pulley is in use or being finished.

A diamond-shaped opening, $b$, is cut or cored out through the bearing part, D, of the pulley.

In one end of the projection $a$, a hole is bored or tapped out, and stopped by a screw, E, while another hole is bored in the side of the projection, tapped and stopped by screw $c$. A hole is also bored through the rim, A, of the pulley, on a line with the last-mentioned hole in projection A.

The operation is as follows: Screw E is removed, and wool or some other fibrous material is forced into chamber F, until it is sufficiently filled, after which, screw E is inserted, and the pulley turned, to bring screw $c$ upon the upper side, when the latter screw is removed, and oil or some other lubricating-substance is turned in until the wool or fibrous material in chamber F is fully saturated, after which screw $c$ is replaced, and the pulley is ready for use.

As the pulley revolves, the fibrous material, protruding through the diamond-shaped opening $b$, delivers to the shaft or journal upon which the pulley runs sufficient oil or lubricating-substance or material to keep the wearing or rubbing-surfaces of both the pulley and shaft or journal well oiled or lubricated.

The projection $a$ may be made sufficiently large to make that side of the pulley overbalance the other side, in which case the pulley would always turn, when freed from the belt, so as to bring the chamber upon the lower side, as shown in the drawings. While in this last-named position, the lubricating-substance would not run out, even if the chamber contained more than could be held by the fibrous material.

By the use of the diamond-shaped opening $b$, the oil upon the journal is forced from both ends towards the centre of the hub, by the inclined edges 1 1, thereby preventing the waste of oil, while at the same time insuring an even and uniform lubrication of the wearing parts.

My invention can be applied, with good results, to clutch-pulleys.

I am aware that various lubricating-devices have heretofore been used in connection with loose pulleys, yet by means of the devices employed by me, and particularly the diamond or lozenge-shaped opening in the lubricating-chamber, I accomplish a new and exceedingly useful result. For whether the pulley be driven by a right or left-hand belt, the edges of the diamond-shaped opening will at all times gather the oil from the ends of the hub and force it towards the centre or interior part of the same.

Having described my improved loose pulley, what I claim therein as new and of my invention, and desire to secure by Letters Patent, is—

In a pulley, having the hub combined with a lubricating-chamber, as described, providing the said chamber with an opening, $b$, extending the length of the hub, and shaped in the manner herein specified, so that the oil discharged from the chamber upon the journal shall be forced from the ends towards the centre of the hub, as set forth.

E. S. CAPEN.

Witnesses:
    THOS. H. DODGE,
    D. L. MILLER.